United States Patent
Gillett

(10) Patent No.: US 11,208,205 B2
(45) Date of Patent: *Dec. 28, 2021

(54) SYSTEM AND METHOD FOR ROTORCRAFT AUTOROTATION ENTRY ASSIST

(71) Applicant: Textron Innovations Inc., Providence, RI (US)

(72) Inventor: Luke Dafydd Gillett, Grapevine, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/892,020

(22) Filed: Jun. 3, 2020

(65) Prior Publication Data
US 2020/0290733 A1   Sep. 17, 2020

Related U.S. Application Data

(63) Continuation of application No. 15/892,558, filed on Feb. 9, 2018.

(51) Int. Cl.
*B64C 27/57* (2006.01)
*G05D 1/08* (2006.01)
(Continued)

(52) U.S. Cl.
CPC ............ *B64C 27/57* (2013.01); *B64C 27/006* (2013.01); *B64C 27/72* (2013.01); *G05D 1/0858* (2013.01); *B64C 27/06* (2013.01)

(58) Field of Classification Search
CPC ....... B64C 27/57; B64C 27/72; B64C 27/006; B64C 27/06; B64C 27/08; B64C 27/12;
(Continued)

(56) References Cited

U.S. PATENT DOCUMENTS 7,223,071 B2   5/2007   Certain
8,360,369 B2   1/2013   Mercer et al.
(Continued)

FOREIGN PATENT DOCUMENTS

EP   2631172 A2   8/2013
EP   3264215 A1   1/2018
(Continued)

*Primary Examiner* — Maceeh Anwari
(74) *Attorney, Agent, or Firm* — Slater Matsil, LLP

(57) ABSTRACT

A rotorcraft including a main rotor, flight controls connected to the main rotor the main rotor, a plurality of engines connected to the main rotor and operable to drive the main rotor, a main rotor revolutions per minute (RPM) sensor, and a monitoring system operable to determine an engine failure of the plurality of engines. The monitoring system is further operable to engage an automated autorotation entry assist process in response to at least determining the engine failure and according to the measured main rotor RPM, where the automated autorotation entry assist process comprises the monitoring system generating one or more rotor RPM related commands according to at least a target main rotor RPM and the measured main rotor RPM, where the automated autorotation entry assist process further comprises controlling the one or more flight controls according to the one or more rotor RPM related commands.

20 Claims, 5 Drawing Sheets

(51) Int. Cl.
*B64C 27/72* (2006.01)
*B64C 27/00* (2006.01)
*B64C 27/06* (2006.01)

(58) Field of Classification Search
CPC .... B64C 27/56; B64C 27/605; G05D 1/0858;
Y02T 50/30
USPC .......................................................... 701/12
See application file for complete search history.

(56) References Cited

U.S. PATENT DOCUMENTS

| | | |
|---|---|---|
| 8,651,425 B2 | 2/2014 | Mercer et al. |
| 8,910,909 B2 | 12/2014 | Mercer et al. |
| 9,511,856 B2 | 12/2016 | Mercer et al. |
| 9,957,041 B2 | 5/2018 | Marvin et al. |
| 2012/0286088 A1 | 11/2012 | Mercer et al. |
| 2017/0144752 A1 | 5/2017 | Vallart |

FOREIGN PATENT DOCUMENTS

| | | |
|---|---|---|
| GB | 2192163 A | 1/1988 |
| WO | 2013120031 A1 | 8/2013 |

SYSTEM AND METHOD FOR ROTORCRAFT AUTOROTATION ENTRY ASSIST

CROSS-REFERENCE TO RELATED APPLICATIONS

This application is a continuation of U.S. application Ser. No. 15/892,558, filed on Feb. 9, 2020, which application is hereby incorporated herein by reference.

TECHNICAL FIELD

The present invention relates generally to a system and method for automating entry into autorotation for a rotorcraft, and, in particular embodiments, to a system and method for automatically controlling a rotorcraft during autorotation to maintain a target main rotor revolution per minute (RPM) when a pilot has released manual control of the rotorcraft.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

An embodiment rotorcraft includes a main rotor, one or more flight controls connected to the main rotor and operational to control flight characteristics of the main rotor, a plurality of engines connected to the main rotor and operable to drive the main rotor when operational, a main rotor revolutions per minute (RPM) sensor operable to determine a measured main rotor RPM at which the main rotor is turning, and a monitoring system operable to determine an engine failure of the plurality of engines. The monitoring system is further operable to engage an automated autorotation entry assist process in response to at least determining the engine failure and according to the measured main rotor RPM, where the automated autorotation entry assist process comprises the monitoring system generating one or more rotor RPM related commands according to at least a target main rotor RPM and the measured main rotor RPM, where the automated autorotation entry assist process further comprises controlling the one or more flight controls according to the one or more rotor RPM related commands.

An embodiment flight control computer includes a processor and a non-transitory computer-readable storage medium storing a program to be executed by the processor. The program including instructions for monitoring an operating state of an engine of a rotorcraft, detecting a failure of the engine according to the operating state, and engaging, in response to the failures of the engine, an autorotation entry assist process. The autorotation entry assist process includes instructions for determining if a pilot has released manual control of the rotorcraft, determining a target flight control setting in response to determining that the pilot has released manual control of the rotorcraft and in response to a main rotor revolutions per minute (RPM) of a main rotor of the rotorcraft being below a predetermined threshold, generating a rotor RPM related command according to at least one of the main rotor RPM or a rate of change of the main rotor RPM, and controlling a flight characteristic of the main rotor by controlling a flight control of the rotorcraft connected to the main rotor according to the rotor RPM command.

An embodiment method includes receiving engine performance data indicating an engine operating condition of one or more engines of a rotorcraft, wherein the one or more engines drive a main rotor of the rotorcraft during operation of the one or more engines, detecting an engine failure condition of the one or more engines according to the performance data, and engaging an automated autorotation entry assist process in response to at least detecting the engine failure. The automated autorotation entry assist process includes receiving a signal indicating a measured main rotor revolutions per minute (RPM) of the main rotor, detecting an in-detent state in response to a pilot being out of manual control of a pilot control of the rotorcraft, generating, in response to detecting the in-detent state, one or more rotor RPM related commands according to at least a target main rotor RPM and the measured main rotor RPM, and sending a first signal to a flight control of the rotorcraft according to the one or more rotor RPM related commands, and controlling the flight control according to the one or more rotor RPM related commands.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
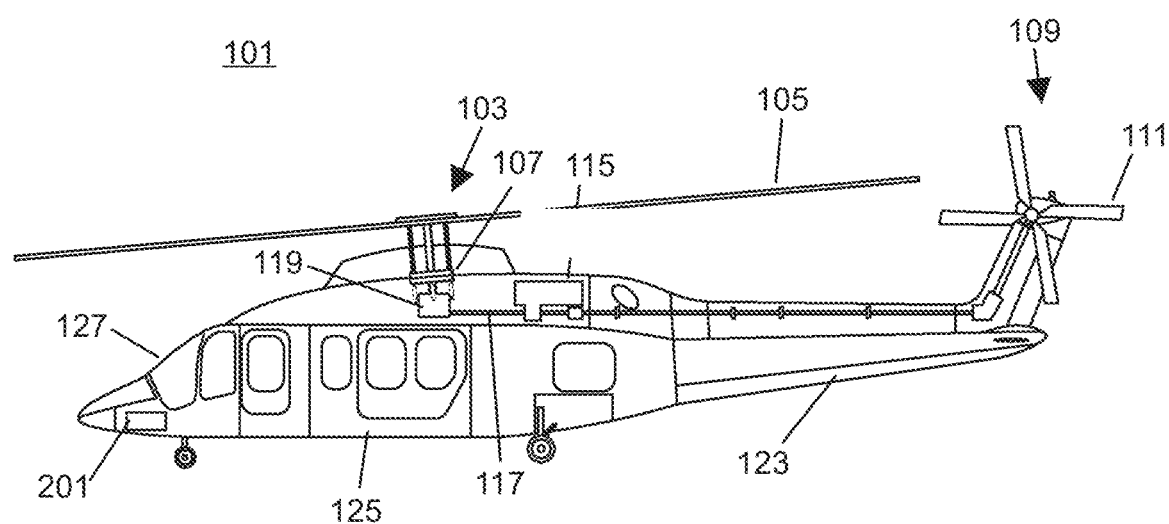
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW system controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot.

Thus, the FBW system adjusts the pilot flight controls so that the controls are in a position associated with the relevant flight parameter. For example, the FBW system may adjust the collective stick to provide suggested or FBW system controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

When the engines in a rotorcraft fail the main rotor is no longer being driven by the engines, but the main rotor continues to turn as a result of the rotational energy put into the main rotor by the engines prior to failure. Skilled rotorcraft pilots are able to take advantage of this residual energy to safely land the rotorcraft using autorotation. However, newer rotorcraft designs make use of main rotor blades that are significantly less massive than previous generations of rotorcraft. Improvements in materials sciences and rotor blade designs permit the main rotor blades to have less mass while having the strength to withstand the stresses of flight. Additionally, the use of lighter weight blades increases the efficiency and responsiveness of the main rotor blades since less engine power is required to power the rotor blades. The decrease in rotor blade mass results in less rotor inertia for a given rotor speed, and the rotors tend to slow more quickly than heavier blades when unpowered.

A system and method for automatically transitioning the rotorcraft into an autorotation is provided herein. An automated system for autorotation entry assist may be implemented by the FBW system to ensure that flight parameters of the rotorcraft are set for autorotation as quickly as practicable after engine failure. The autorotation entry assist system monitors the engines for failure, and on detecting engine failure that results in a need for autorotation, sets the collective pitch of the main rotor blades, as well as the pitch attitude of the rotorcraft, to maintain the rotor speed within a predetermined envelope. Additionally, the autorotation entry assist system may manage the pitch attitude of the rotorcraft to bring the rotorcraft down to a speed or glide path that is optimized for autorotation.

The automated system for autorotation entry assist provides faster recognition of the engine failure that leads to a need for autorotation than a pilot may provide, and faster implementation of the autorotation entry than a pilot, particularly in situations where a pilot may not be fully engaged in flying the rotorcraft, for example, when a pilot is reading a map, dealing with a navigation system or the like. The autorotation entry assist system may also permit the pilot to override the automated commands to allow the pilot to address any situation specific demands. Thus, the autorotation entry assist system will automatically put the rotorcraft into autorotation and maintain the state until the pilot takes over control of the rotorcraft.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the main rotor system 103 and the anti-torque system through a main rotor transmission 119 and a tail rotor transmission 121, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain features, the rotorcraft 101 may have a variety of implementation-specific configurations. For instance, in some embodiments, cockpit 127 is configured to accommodate a pilot or a pilot and co-pilot. It is also contemplated, however, that rotorcraft 101 may be operated remotely, in which case, cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case, cockpit 127 could be eliminated entirely in order to save space and cost.

Figure 2:
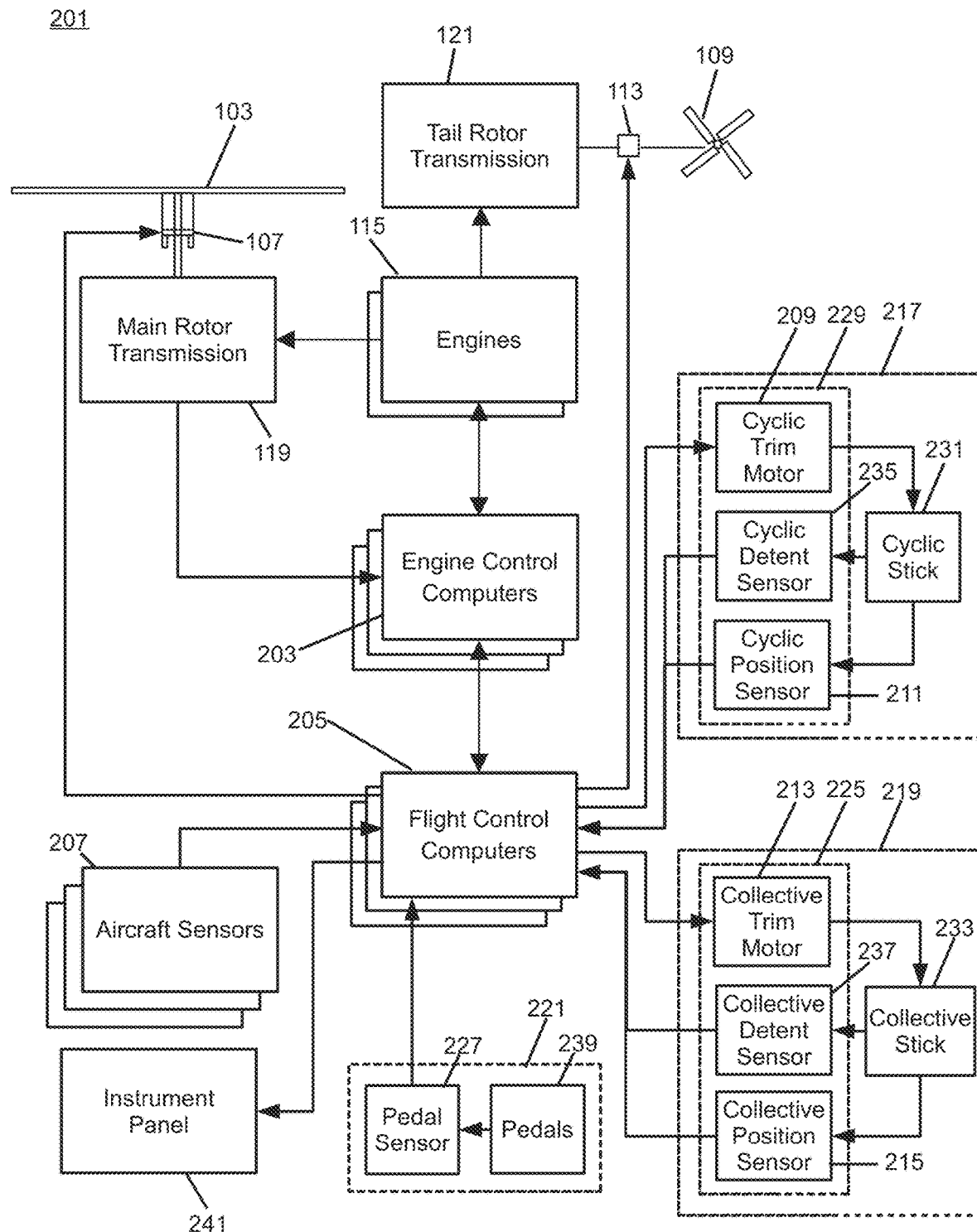
FIG. 2 is a block diagram of a fly-by-wire flight control system for the rotorcraft, according to some embodiments.

FIG. 2 is a block diagram of a fly-by-wire flight control system 201 for the rotorcraft 101, according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft 101. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other aircraft sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a positon determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic trim motors 209 and collective trim motors 213 may drive the cyclic stick 231 and collective stick 233, respectively, to suggested positions. The cyclic trim motors 209 and collective trim motors 213 may drive the cyclic stick 231 and collective stick 233, respectively, to suggested positions, but this movement capability may also be used to provide tactile cueing to a pilot. The cyclic trim motors 209 and collective trim motors 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the cyclic trim motors 209 and collective trim motors 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. The cyclic detent sensor 235 and collective detent sensor 237 detect motion and/or position of the respective control stick that is caused by pilot input, as opposed to motion and/or position caused by commands from the FCCs 205, rotorcraft vibration, and the like and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
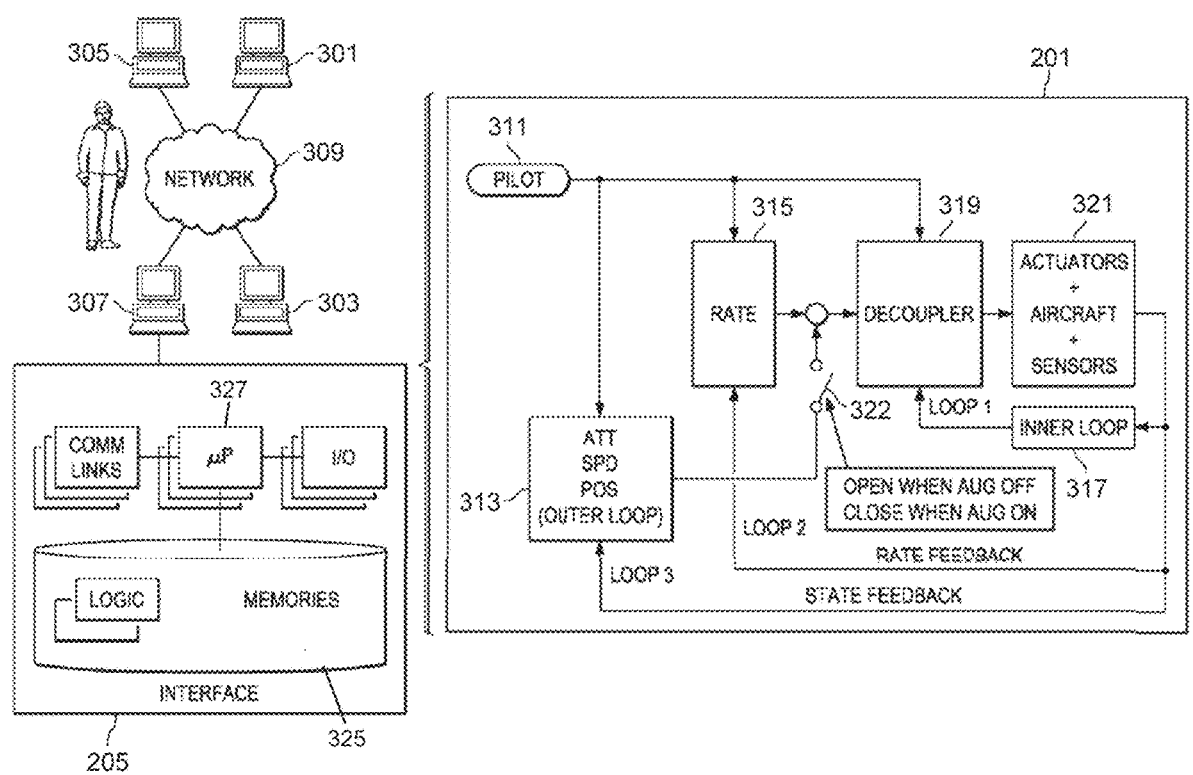
FIG. 3 is a block diagram of the flight control system, according to some embodiments.

FIG. 3 is a block diagram of the flight control system 201, according to some embodiments. Some operational aspects of the flight control system 201 are shown in a highly schematic fashion. In particular, the flight control system 201 is schematically shown as being implemented as a series of inter-related feedback loops running certain control laws. Although the flight control system 201 is illustrated as being a three-loop flight control system, it should be appreciated that the flight control system 201 could be implemented in a different manner, such as with a different quantity of control loops.

In some embodiments, elements of the flight control system 201 may be implemented at least partially by the FCCs 205. However, all, some, or none of the components (301, 303, 305, 307) of flight control system 201 could be located external or remote from the rotorcraft 101 and communicate to on-board devices through a network connection 309.

The flight control system 201 has a pilot input 311, an outer loop 313, a middle loop 315, an inner loop 317, a decoupler 319, and aircraft equipment 321 (corresponding, e.g., to flight control devices such as swashplate 107, tail rotor transmission 121, etc.; to actuators (not shown) driving the flight control devices; to sensors such as aircraft sensors 207, cyclic position sensors 211, collective position sensors 215, cyclic detent sensors 235, collective detent sensors 237, etc.; and the like).

In the example shown, a three-loop design separates the inner stabilization and rate feedback loops from outer guidance and tracking loops. The control law structure primarily assigns the overall stabilization task and related tasks of reducing pilot workload to inner loop 317. Next, the middle loop 315 (sometimes called the rate loop) provides rate augmentation. Outer loop 313 focuses on guidance and tracking tasks. Since inner loop 317 and middle loop 315 provide most of the stabilization, less control effort is required at the outer loop level. As representatively illustrated, a switch 323 may be provided to turn outer loop flight augmentation on and off, the tasks of outer loop 313 are not necessary for flight stabilization.

In some embodiments, the inner loop 317 and middle loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. According to some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

The flight control system 201 may be realized as programming executed by the FCCs 205. The programming includes instructions implementing aspects of the flight control system 201. The FCCs 205 may include memories 325, such as non-transitory computer readable storage mediums, that store the programming. One or more processors 327 are connected to the memories 325, and are operable to execute the programming.

In some embodiments, the FCCs 205 monitor signals from the ECCUs 203 to determine whether all engines of a rotorcraft have failed, and then control aircraft equipment 321 such as swashplate actuators, based on whether the aircraft controls are ID, the forward speed of the rotorcraft, the descent rate of the rotorcraft, the main rotor RPM, the rate of change of the main rotor RPM, and the like.

Figure 4A:
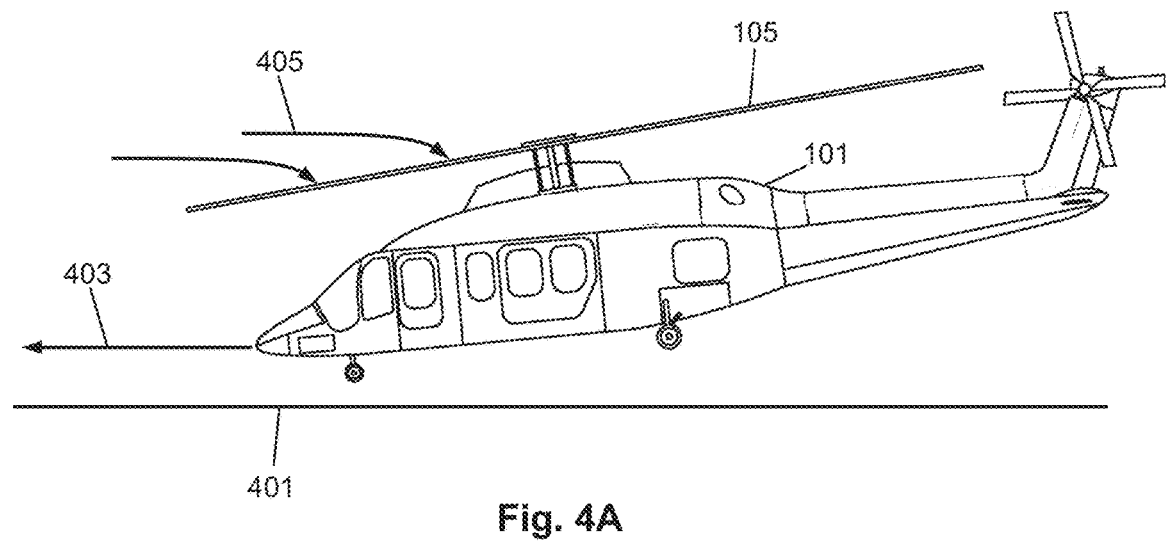
FIGS. 4A and 4B illustrate a rotorcraft in different flight modes according some embodiments.
Figure 4B:
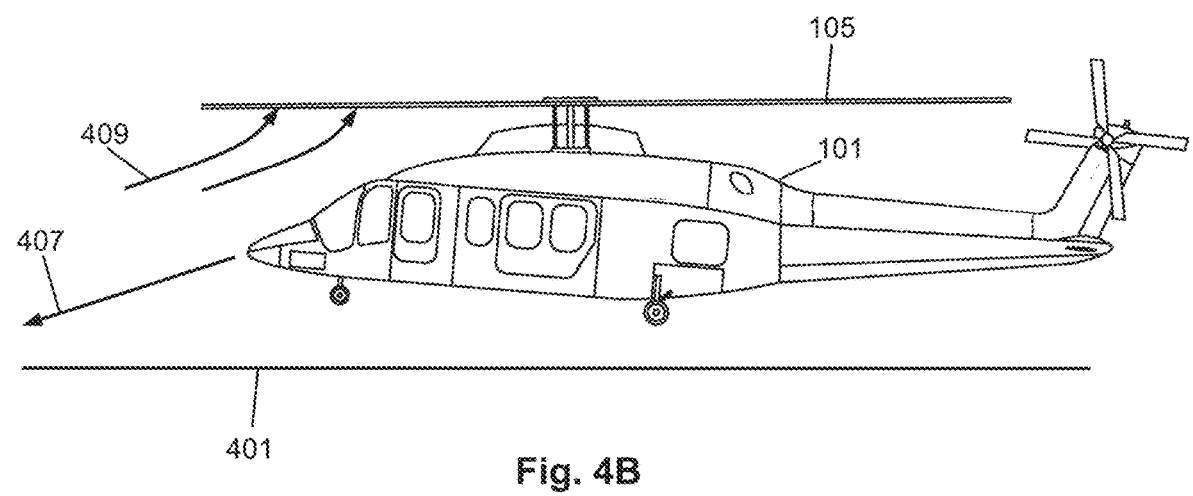

FIGS. 4A and 4B illustrate a rotorcraft 101 in different flight modes according some embodiments. FIG. 4A illustrates a rotorcraft 101 in forward flight and before autorotation according to some embodiments. The rotorcraft 101 may have a forward flight path 403 that is substantially level with, or parallel to, a ground reference plane 401. It should be understood that the ground reference plane 401 does not represent the ground itself, but represents a plane parallel to the ground for reference. When the rotorcraft 101 has a substantially forward flight path 403, the rotorcraft 101 is pitched so that the main rotor blades 105 provide forward thrust to move the rotorcraft 101 forward as well as vertical thrust to keep the rotorcraft 101 aloft. With this pitch, incoming air 405 enters the main rotor blades 105 from the top, permitting the main rotor blades 105 to provide lift or thrust by moving the incoming air 405 through the main rotor blades 105 from top to bottom.

FIG. 4B illustrates a rotorcraft 101 in autorotation according to some embodiments. After a total engine failure, where all engines of the rotorcraft 101 fail, the main rotor blades 105 are no longer powered. The autorotation should maintain the speed or RPM of the main rotor blades 105, so that the main rotor blades 105 retain as much kinetic energy as safely possible. The retained kinetic energy is then used in a flare for landing at the end of the autorotation, with the relatively rapidly spinning main rotor blades quickly angles upward to provide increased vertical lift. Thus, the kinetic energy stored in the main rotor blades 105 is traded for vertical lift, allowing the rotorcraft to slow its vertical descent just before landing, and land at a safe vertical speed.

In some embodiments, the automated autorotation entry assist system transitions the rotorcraft from a pitch attitude associated with powered flight to a pitch attitude that is more optimal for autorotation. The automated autorotation entry assist system may cause rotorcraft 101 to pitch upwards, so that incoming air 409 enters the main rotor blades from below. This incoming air 409 may then be used to keep the main rotor blades 105 spinning at a predetermined rate, or within a predetermined speed or RPM range. This provides some lift to keep the rotorcraft 101 flying, or at least decrease the descent rate. When the rotorcraft 101 enters autorotation, the rotorcraft 101 beings a downward flight path 407 that is toward the ground reference plane 401, but maintains a more nose up attitude than during forward flight. Thus, the FBW system may control the rotorcraft 101 by changing the pitch attitude of the rotorcraft, changing the pitch of the main rotor blades and changing the forward speed of the rotorcraft to optimize the flight characteristics of the rotorcraft and ensure that the incoming air keeps the main rotor blades 105 spinning at a desired or predetermined speed or RPM.

Figure 5:
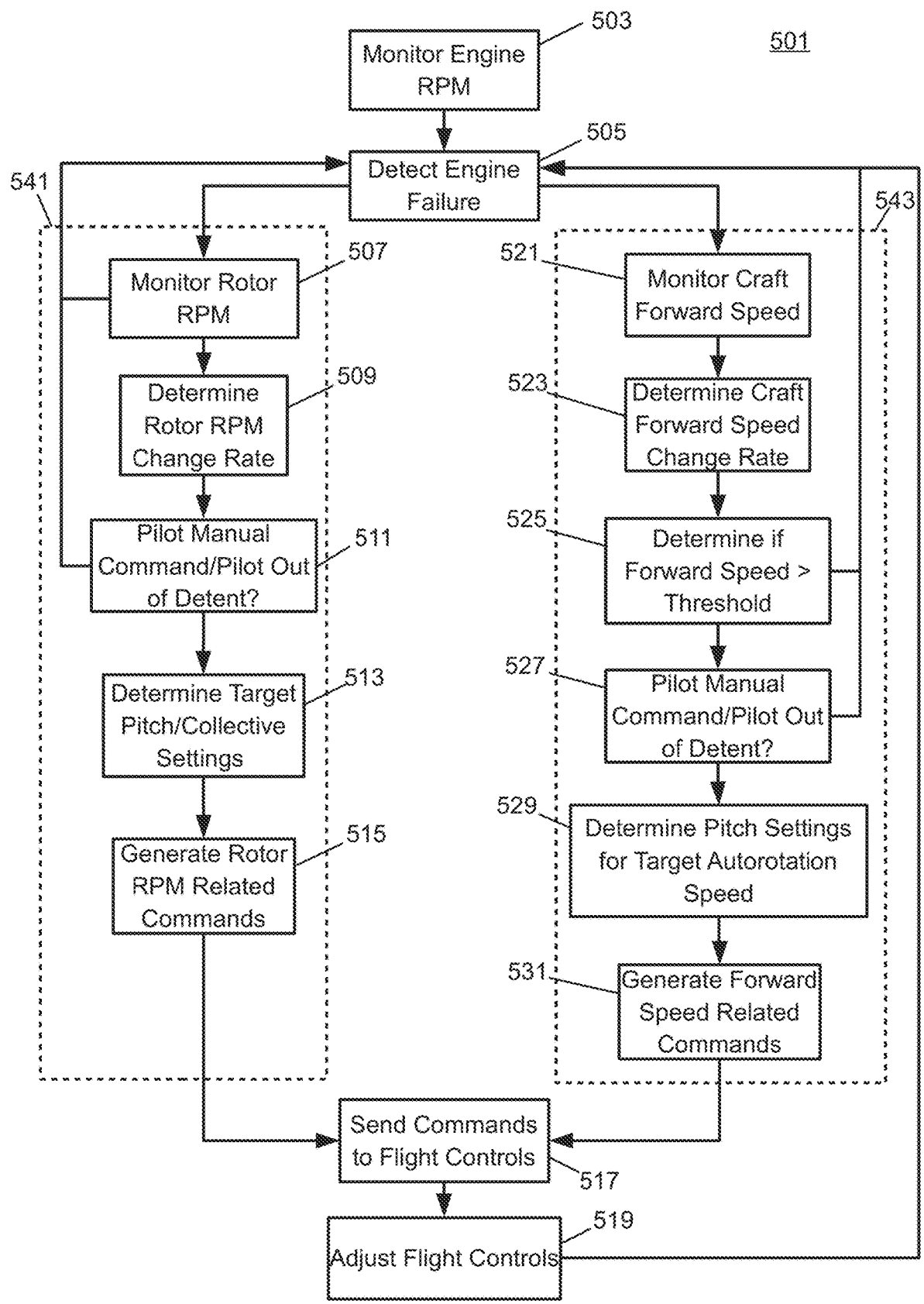
FIG. 5 is a flow diagram illustrating a method for automated autorotation entry assist according to some embodiments.

FIG. 5 is a flow diagram illustrating a method 501 for automated autorotation entry assist according to some embodiments. Initially, in block 503, the engine RPM is monitored. In some embodiments, a monitoring system such as the FCCs monitor the engines. The monitoring system may receive engine performance data that may be reports, signals or other data from sensors or devices, such as the ECCUs, RPM monitors, power indicators, torque indicators, or the like that provide information engine performance data, which may include the speed, RPM, power output, or the like, for each engine in a rotorcraft. In other embodiments, the monitoring system may be ECCUs or another standalone system, and may monitor the engine performance data. In a rotorcraft having more than one engine, the monitoring system may receive engine performance data on each engine, or may receive a report aggregating engine performance data for all of the engines.

In block 505, the rotorcraft detects engine failure. In some embodiments, the monitoring system may be FCCs that monitor the state of the engines. The monitoring system may determine that autorotation is appropriate based on the engine performance data, and may engage an autorotation entry assist process. For example, when the monitoring system determines that all engines of the rotorcraft have failed, the monitoring system may determine that autorotation is necessary. When the monitoring system determines that autorotation is necessary, the monitoring system may engage the autorotation entry assist process by initiating an autorotation rotor speed control process 541 and an autorotation forward speed control process 543. The monitoring system may determine that each engine has failed when the engine performance falls below a predetermined threshold, and the predetermined threshold may be below the lowest controlled or normal power setting for the engine. For example, the monitoring system may determine that an engine has failed in response to receiving engine performance data indicating that the particular engine has an RPM, power output, or other operating parameter that is below an engine operating threshold. When the threshold is below the normal power setting, the monitoring system may identify an engine failure before the engine completely stops.

In some embodiments, the rotorcraft initiates an autorotation rotor speed control process 541 in response to detecting engine failure. The autorotation rotor speed control process 541 may, in some embodiments, include processes for altering the main rotor blade pitch, and/or the pitch attitude of the rotorcraft in order to maintain the main rotor RPM at a predetermined RPM or speed, or within a predetermined range. It should be understood that maintaining the main rotor RPM may also be referred to as maintaining the main rotor speed, and that maintaining the main rotor RPM at a predetermined RPM or speed may include maintaining the main rotor RPM or speed within a range associated with a predetermined speed.

In some embodiments, the autorotation rotor speed control process 541 includes monitoring a rotor RPM in block 507. In some embodiments, the monitoring of the main rotor RPM, or main rotor speed, is performed separately from the monitoring the engine RPM, as during engine failure, the main rotor blade may become decoupled from the engines, with the main rotor blades maintaining a speed that is higher than the speed the engines would drive the main rotor blades as the engines slow down. The rotorcraft may have one or more sensors that monitor the main rotor blade speed, and in some embodiments, the ECCUs or FCCs may receive a signal from the main rotor blade speed sensors. In some embodiments, the ECCUs handle matching the engine speed, engine power, and main rotor speed, and monitor the engine operating conditions to determine a main rotor speed, and the ECCUs may send main rotor speed data indicating the main rotor speed to the FCCs. In other embodiments, the FCCs may receive a sensor signal carrying main rotor speed data from the sensors.

Monitoring the rotor RPM may, in some embodiments, include determining the RPM of the main rotor, and may also include determining an error or delta of the main rotor RPM. The main rotor RPM may differ from a target main rotor RPM, and the difference between the measured main rotor RPM and the target main rotor RPM may be the main rotor RPM error or delta. In some embodiments, the target main rotor RPM may be associated with the standard powered rotor RPM, a maximum powered main rotor RPM, a maximum continuous main rotor RPM, or the like. For example, the target main rotor RPM may be wo% of the standard powered rotor RPM, or may be greater than the standard main rotor RPM, for example, a main rotor emergency RPM or takeoff RPM.

In block 509, the monitoring system determines a rotor RPM change rate. In some embodiments, the monitoring system, the FCCs, the ECCUs, or the like, store previous rotor blade RPM measurement values and compares the current rotor RPM value to determine a rate of change of the main rotor RPM. Just after the engines have failed, the main rotor RPM will likely to be decreasing since the engines are no longer powering the main rotor, particularly when the rotorcraft is in a nose down pitch attitude associated with powered forward flight. Determining the main rotor RPM rate of change give an indication of how rapidly the main rotor RPM is decaying, which may indicate the magnitude needed for corrective actions. The main rotor RPM rate of change may be the result of a linear calculation, for example, a change in main rotor RPM between the current rotor RPM and the most recent previous main rotor RPM, with the difference divided by the time over which the change happens. In other embodiments, the main rotor RPM rate of change may be the result of a non-linear calculation, such as taking a derivative of multiple RPM readings. In other embodiments, the main rotor RPM rate of change may be determined according to the values of multiple previous main rotor RPM readings and a current main rotor RPM reading, such as an average over a predetermined number of readings, over a predetermined time window, or by taking a moving average, or the like.

In some embodiments, the monitoring system uses the monitored rotor speed to determine whether flight controls need to be adjusted to maintain the predetermined rotor speed. When the monitoring system determines, from monitoring the rotor RPM, that the main rotor RPM has fallen below an adjustment threshold, the monitoring system determines that the pitch attitude of the rotor craft, or the blade pitch of the main rotor blades should be adjusted. Additionally, the main rotor RPM rate of change may be used to determine the magnitude of adjustments made to the flight controls to maintain the main rotor speed. For example, when a main rotor RPM is rapidly dropping, the rate of change of the main rotor RPM will be relatively large, and the monitoring system may implement a relatively large attitude pitch adjustment or main rotor blade pitch adjustment.

The monitoring system provides automated autorotation entry assist by adjusting the pitch attitude of the rotorcraft or the blade pitch of the main rotor blades upon detection of complete engine failure. However, the pilot may override the automatic control actions by taking the rotorcraft out-of-detent by grasping or moving the cockpit controls. In this way, the monitoring system may cause the rotorcraft to enter an efficient autorotation state should the pilot be distracted or not be actively controlling the rotorcraft at the time of engine failure. Thus, in block 511, the monitoring system determines whether the pilot is in manual command of the rotorcraft or has the rotorcraft out-of-detent. In some embodiments, the pilot may take the rotorcraft out-of-detent by manually controlling the rotorcraft or by turning flight augmentation off, for example, by activating an augmentation-off (aug-off) button.

While the method 501 is illustrated herein as having block 511 after block 507 and 509, such an arrangement is not intended to be limiting, as determining whether the automated flight control adjustment for autorotation entry assist is required or not is performed according to the aircraft being in-detent where the pilot is not in manual control, and further according to the main rotor RPM or the main rotor RPM rate of change being outside of respective predetermined thresholds. Thus, the monitoring system may determine whether the pilot is in manual control or the rotorcraft is out-of-detent, as shown in block 511, prior to monitoring the main rotor RPM of block 507 or prior to determining the main rotor RPM rate of change of block 509.

If the monitoring system determines that automated flight control adjustment for autorotation entry assist is not required, the monitoring system returns to block 505 and repeats the process. Thus, the method 501 for automated autorotation entry assist may be running continuously in order to continuously monitor the state of the rotorcraft. For example, if the monitoring system determines, in block 507, that the main rotor RPM is at a predetermined speed or within a predetermined speed range, the monitoring system may return to block 505 as part of the continuous monitoring of the engine failure state and main rotor RPM. However, should the main rotor RPM fall below the predetermined speed, or the pilot release manual control of the rotorcraft, the monitoring system may engage the automatic autorotation entry assist in a subsequent pass through the method 501.

If the monitoring system determines that automated flight control adjustment for autorotation entry assist is required, the monitoring system determines the adjustments needed for the flight controls. In block 513, the monitoring system determines target collective and pitch settings for the rotorcraft. The target setting for the collective and pitch may be generated separately, with a target collective setting being a collective or blade pitch setting generated separately from a cyclic setting that is used to control the pitch attitude of the rotorcraft.

In some embodiments, the monitoring system determines the target collective and pitch settings for the rotorcraft according to the main rotor RPM or the rotor RPM rate of change. In some embodiments, a target collective pitch setting is determined to lower the collective pitch of the main rotor blades in order to reduce the drag of the main rotor blades and increase the main rotor blade RPM. The pitch attitude may also be set by determining a cyclic setting that causes the rotorcraft to pitch upward to maintain the rotorcraft at an attitude that permits incoming air to assist in turning the main rotor blades at a desired main rotor RPM.

In some embodiments, the target settings for the collective and pitch are proportional to the main rotor RPM or the main rotor RPM rate of change. For example, the greater the main rotor RPM rate of change, or the greater the main rotor blade RPM error, the larger the decrease in the main rotor blade pitch or the larger the decrease in the forward pitch attitude of the rotorcraft. In some embodiments, the target pitch setting may be determined based on the main rotor RPM, main rotor RPM rate of change, the current main rotor collective setting, the main rotor RPM target setting, the forward speed of the rotorcraft, or a combination of the same. For example, the target pitch setting may be set relatively low so that the rotorcraft pitches nose up very little when the airspeed is low, so that the rotorcraft pitching up does not cause the rotorcraft to lose substantial forward airspeed. In another example, when the current main rotor collective setting is low, with the main rotor blades having a small, or low main rotor blade pitch, the rotorcraft's ability to further lower the pitch of the main rotor blades may be limited since the main rotor pitch is already near the lower limit. In this example, when the main rotor RPM rate of change is high, meaning that the main rotor speed is decaying rapidly, the target pitch setting may be relatively high to cause the rotorcraft to pitch up and cause more incoming air to low through the main rotor blades and increase the main rotor speed. However, in this example, when the main rotor RPM rate of change is negligible, the main rotor RPM is within the predetermined range of acceptable main rotor RPMs, and the airspeed is at or below an optimized airspeed for autorotation, the pitch attitude of the rotorcraft may be maintained to avoid overly slowing the rotorcraft. Additionally, in some embodiments, the monitoring system may avoid attempting to pitch the rotorcraft upwards to increase the main rotor RPM when the rotorcraft is below a predetermined threshold, as the lack of forward speed results in insufficient air moving through the main rotor blades to efficiently increase the main rotor RPM.

In block 515, the monitoring system generates rotor RPM related commands. The rotor RPM related commands may include commands such as cyclic, pitch or collective commands for flight control devices such as swashplate actuators that are based on, or generated according to, the target pitch and collective settings. In some embodiments, the FCCs may generate the rotor RPM related commands, and in other embodiments, the ECCUs may generate the commands, or a standalone monitoring system may generate the rotor RPM related commands and send the rotor RPM related commands to the FCCs or ECCUs for execution. In other embodiments, the rotor RPM related flight control commands may include control surface commands such as elevator or rudder commands, for example, to control the pitch attitude of the rotorcraft when the forward airspeed is great enough for the control surfaces to be effective.

In block 517, the generated rotor RPM related commands are sent to the flight controls. In some embodiments, the rotor RPM related commands are one or more of cyclic attitude pitch commands and collective blade pitch commands, and the commands may be sent to swashplate actuators. In block 519, the flight controls are adjusted. In some embodiments, the flight controls include swashplate actuators, and adjusting the flight controls may include executing the rotor RPM related commands to drive the swashplate to target collective or blade pitch settings and to target attitude pitch or cyclic settings.

In some embodiments, the rotorcraft may also, or alternatively, initiate the autorotation forward speed control process 543 in response to detecting engine failure. The autorotation forward speed control process 543 may, in some embodiments, include processes for altering the pitch attitude of the rotorcraft in order to achieve or maintain the forward airspeed of the rotorcraft at, or above, a predetermined autorotation airspeed threshold, or within a predetermined autorotation airspeed range. In some embodiments, the rotorcraft initiates the autorotation forward speed control process 543 in response to detecting engine failure.

The autorotation forward speed control process 543 may, in some embodiments, include processes for altering the main rotor blade pitch using the cyclic swashplate control to adjust or change the pitch attitude of the rotorcraft to control the forward airspeed of the rotorcraft. Modifying the pitch attitude of the rotorcraft may be performed in conjunction with autorotation rotor speed control process 541, and in some embodiments, may be subordinate to the autorotation rotor speed control process 541. For example, the autorotation forward speed control process 543 may determine a pitch attitude needed to achieve a desired forward speed, and may determine a target pitch setting based on any pitch setting determined by the autorotation rotor speed control process 541.

The autorotation rotor speed control process 541 may be implemented immediately when autorotation entry assist is engaged to bring the main rotor speed as quickly as possible back to the nominal, or target, main rotor speed, and may use the patch attitude change during the initial recovery of the rotor RPM. The autorotation forward speed control process 543 tends to be an optimization process rather than a recovery or conservation process like the autorotation rotor speed control process 541. Thus, the autorotation forward speed control process 543 is implemented more gradually than the autorotation rotor speed control process 541. Therefore, in other embodiments, the autorotation forward speed control process 543 may be initiated after the autorotation rotor speed control process 541, or after the autorotation rotor speed control process 541 stabilizes the main rotor RPM. For example, the monitoring system may delay implementing the autorotation forward speed control process 543 until the autorotation rotor speed control process has stabilized the main rotor speed, which may be indicated by the main rotor speed or main rotor speed rate of change, or by the magnitude of the pitch attitude or blade pitch commands generated by the autorotation rotor speed control process 541. Therefore, the monitoring system may delay implementing the autorotation forward speed control process 543 until the magnitude of the autorotation rotor speed control process 541 pitch command falls below a threshold, until a predetermined time has passed, or the like.

In some embodiments, the autorotation forward speed control process 543 includes, in block 521, monitoring the forward speed of the rotorcraft. The rotorcraft may have one or more sensors that monitor the rotorcraft's airspeed, and in some embodiments, the sensors may be the same as, or different from, the instrumentation sensors used to present information to the FCCs or to the pilot. Monitoring the forward speed may, in some embodiments, include determining an error or delta of the forward speed. The forward speed may differ from a target forward speed, and the difference between the measured forward speed and the target forward speed may be the forward speed error or delta. In some embodiments, the target forward speed may be related to a glide path or glide speed of the rotorcraft optimized for autorotation. For example, the target forward speed may be a best autorotation forward speed related to a best power-off glide speed ($V_{BG}$), and may be the best horizontal speed for maximum glide distance.

In some embodiments, the target forward speed may be set to a default value stored in a memory of the monitoring system. In other embodiments, the target forward speed may be calculated dynamically, permitting the monitoring system to take altitude, rotorcraft weight, weather conditions, or the like into consideration. Additionally, the pilot may modify or override the target forward speed to optimize the target forward speed to a best autorotation speed that, in the pilot's judgement, optimizes performance of the rotorcraft. In some embodiments, the pilot may adjust the default value stored in the monitoring system memory, or may adjust the target forward speed during autorotation. Thus, the pilot may adjust the target forward speed to an optimized best autorotation speed that accounts for rotorcraft weight or balance, position of a potential landing site, flight conditions, damage to the rotorcraft, or the like.

In block 523, the monitoring system determines a forward speed change rate. In some embodiments, the monitoring system, the FCCs, the ECCUs, or the like, store previous forward speed measurement values and compares the current forward speed value to determine a rate of change of the forward speed. The rate of change of the forward speed may be calculated according to process described above with respect to the calculation of the main rotor ROM rate of change.

In block 525, the monitoring system determines whether the measures forward speed is greater than a threshold or target forward speed. The monitoring system may implement the autorotation forward speed control process 543 to automatically take the rotorcraft to the best autorotation forward speed when the forward speed is above a forward speed threshold such as a best autorotation forward speed in order to conserve the altitude of the rotorcraft. In contrast, when the rotorcraft is below the best autorotation forward speed, the autorotation forward speed control process 543 may maintain the current forward speed, or avoid attempting to modify the forward speed, as the rotorcraft may need to trade altitude to increase the forward speed, and performing such a maneuver automatically may be undesirable during autorotation.

The monitoring system provides further automated autorotation entry assist by adjusting the pitch attitude of the rotorcraft upon detection of complete engine failure. In block 527, the monitoring system determines whether the pilot is in manual command of the rotorcraft or has the rotorcraft out-of-detent. If the monitoring system determines that the pilot has manual control of the craft cause the rotorcraft to be OOD, or the monitoring system determine that the rotorcraft forward speed is not above the forward speed threshold, the monitoring system returns to block 505 and repeats the process so that the monitoring system is continuously monitoring the forward speed of the rotorcraft and automatically adjust the forward speed when necessary.

While the method 501 is illustrated herein as having block 527 after blocks 521, 523 and 525, such an arrangement is not intended to be limiting, as determining whether the automated flight control adjustment for forward speed control in autorotation entry assist is required or not is performed according to the aircraft being in-detent where the pilot is not in manual control, and further according to the forward speed or the forward speed rate of change being outside of respective predetermined thresholds. Thus, the monitoring system may determine whether the pilot is in manual control or the rotorcraft is out-of-detent, as shown in block 527, prior to, in or any order with the remaining blocks of the autorotation forward speed control process 543.

If the monitoring system determines that automated flight control adjustment for forward speed control in autorotation entry assist is required, the monitoring system determines the adjustments needed for the flight controls. In block 529, the monitoring system determines target pitch settings for the rotorcraft. The target pitch setting may be generated according to the current monitored forward speed, the forward speed rate of change, or any pitch commands generated by the autorotation rotor speed control process 541. In some embodiments, the target pitch setting is proportional to the forward speed delta or inversely proportional to the forward speed rate of change. Thus, if the rotorcraft has a forward speed that is significantly greater than the target forward speed, the pitch command may be greater than if the forward speed is closer to the target forward speed.

The target pitch setting may be a cyclic setting that causes the rotorcraft to pitch upward to slow the rotorcraft at a predetermined rate, or to stop slowing the aircraft to maintain the aircraft at a target forward speed. Additionally, the monitoring system may use the forward speed rate of change to determine the pitch setting. Where the forward speed rate of change indicates that the rotorcraft is moving at a constant speed, or slowing more slowly than a predetermined deceleration rate, the monitoring system may generate a pitch command that cause the rotorcraft to increase its rate of deceleration. Conversely, if the monitoring system determines that the rotorcraft is decelerating too quickly, or is decelerating while it is near the target forward speed, the monitoring system may generate a pitch command that reduces the deceleration. In some embodiments, the monitoring system may determine whether a deceleration, forward speed, or forward speed rate of change is being cause by a pitch command generated by the autorotation rotor speed control process 541, and may avoid generating a pitch command while the autorotation rotor speed control process 541 generates its pitch command, or while the pitch command generated by the autorotation rotor speed control process 541 is greater than a predetermined threshold. For example, if the autorotation rotor speed control process 541 generates a command for a large nose up pitch command, the autorotation forward speed control process 543 may avoid generating new automated pitch commands while the autorotation rotor speed control process 541 generates the pitch command to control the main rotor RPM or until the magnitude of the autorotation rotor speed control process 541 pitch command falls below a threshold.

In block 531, the monitoring system generates forward speed related commands. The forward speed related commands may include commands such as cyclic or pitch commands for flight control devices such as swashplate actuators that are based on, or generated according to, the target pitch settings. In some embodiments, the FCCs may generate the forward speed related commands, and in other embodiments, the ECCUs may generate the forward speed related commands, or a standalone monitoring system may generate the forward speed related commands and send the forward speed related commands to the FCCs or ECCUs for execution. In other embodiments, the forward speed related commands may include control surface commands such as elevator or rudder commands, for example, to control the pitch attitude of the rotorcraft when the forward airspeed is great enough for the control surfaces to be effective.

In block 517, the generated forward speed related commands are sent to the flight controls. In some embodiments, the forward speed related commands are one or more of cyclic or pitch commands, and the commands may be sent to flight controls. In block 519, the flight controls are adjusted. In some embodiments, the flight controls include swashplate actuators, and adjusting the flight controls may include executing the forward speed related commands to drive the swashplate to target cyclic settings to set the pitch attitude of the rotorcraft.

An embodiment rotorcraft includes a main rotor, one or more flight controls connected to the main rotor and operational to control flight characteristics of the main rotor, a plurality of engines connected to the main rotor and operable to drive the main rotor when operational, a main rotor revolutions per minute (RPM) sensor operable to determine a measured main rotor RPM at which the main rotor is turning, and a monitoring system operable to determine an engine failure of the plurality of engines. The monitoring system is further operable to engage an automated autorotation entry assist process in response to at least determining the engine failure and according to the measured main rotor RPM, where the automated autorotation entry assist process comprises the monitoring system generating one or more rotor RPM related commands according to at least a target main rotor RPM and the measured main rotor RPM, where the automated autorotation entry assist process further comprises controlling the one or more flight controls according to the one or more rotor RPM related commands.

In some embodiments, the rotorcraft further includes a pilot control, and the monitoring system is further operable to engage the automated autorotation entry assist process in response to a pilot being out of manual control of the pilot control. In some embodiments, the monitoring system is further operable to engage the automated autorotation entry assist process according a rate of change of the main rotor RPM. In some embodiments, the one or more rotor RPM related commands include at least one of a first command to change a pitch attitude of the rotorcraft or a second command to change a collective blade pitch angle of main rotor blades of the main rotor. In some embodiments, the automated autorotation entry assist process include the monitoring system generating the one or more rotor RPM commands in response to the measured main rotor RPM being below a main rotor RPM threshold. In some embodiments, the monitoring system is operable to generate at least one of the first command to change the pitch attitude of the rotorcraft in proportion to a rate of change of the main rotor RPM or the second command to change the collective blade pitch angle in proportion to the rate of change of the main rotor RPM. In some embodiments, the first command to comprises a command to pitch a front of the rotorcraft upwards, and wherein the second command comprises a command to decrease the collective blade pitch angle of main rotor blades. In some embodiments, the automated autorotation entry assist process further includes the monitoring system generating one or more forward speed related commands in response to a forward speed of the rotorcraft being above a target forward speed associated with a glide speed of the rotorcraft and according to at least a forward speed of the rotorcraft and the target forward speed, and the automated autorotation entry assist process further includes controlling the one or more flight controls according to the one or more forward speed related commands, and the one or more forward speed related commands include one or more commands to adjust a pitch attitude of the rotorcraft.

An embodiment flight control computer includes a processor and a non-transitory computer-readable storage medium storing a program to be executed by the processor. The program including instructions for monitoring an operating state of an engine of a rotorcraft, detecting a failure of the engine according to the operating state, and engaging, in response to the failures of the engine, an autorotation entry assist process. The autorotation entry assist process includes instructions for determining if a pilot has released manual control of the rotorcraft, determining a target flight control setting in response to determining that the pilot has released manual control of the rotorcraft and in response to a main rotor revolutions per minute (RPM) of a main rotor of the rotorcraft being below a predetermined threshold, generating a rotor RPM related command according to at least one of the main rotor RPM or a rate of change of the main rotor RPM, and controlling a flight characteristic of the main rotor by controlling a flight control of the rotorcraft connected to the main rotor according to the rotor RPM command.

In some embodiments, the instructions for generating the rotor RPM related command include instructions for generating at least one of a first command to change a pitch attitude of the rotorcraft or a second command to change a collective blade pitch angle of main rotor blades of the main rotor. In some embodiments, the instructions for generating the rotor RPM related command include instructions for generating at least one of the first command to change the pitch attitude of the rotorcraft in proportion to the rate of change of the main rotor RPM or the second command to change the collective blade pitch angle of main rotor blades of the main rotor in proportion to the rate of change of the main rotor RPM. In some embodiments, the first command includes a command to pitch a front of the rotorcraft upwards, and wherein the second command comprises a command to decrease the collective blade pitch angle of the main rotor blades. In some embodiments, the instructions for engaging the autorotation entry assist process further include instructions for generating a forward speed related command in response to a forward speed of the rotorcraft being above a target forward speed associated with a glide speed of the rotorcraft and according to at least a forward speed of the rotorcraft and the target forward speed, wherein the forward speed related command comprises one or more commands to adjust a pitch attitude of the rotorcraft, and controlling a flight characteristic of the main rotor by controlling a flight control of the rotorcraft connected to the main rotor according to the forward speed related command.

An embodiment method includes receiving engine performance data indicating an engine operating condition of one or more engines of a rotorcraft, wherein the one or more engines drive a main rotor of the rotorcraft during operation of the one or more engines, detecting an engine failure condition of the one or more engines according to the performance data, and engaging an automated autorotation entry assist process in response to at least detecting the engine failure. The automated autorotation entry assist process includes receiving a signal indicating a measured main rotor revolutions per minute (RPM) of the main rotor, detecting an in-detent state in response to a pilot being out of manual control of a pilot control of the rotorcraft, generating, in response to detecting the in-detent state, one or more rotor RPM related commands according to at least a target main rotor RPM and the measured main rotor RPM, and sending a first signal to a flight control of the rotorcraft according to the one or more rotor RPM related commands, and controlling the flight control according to the one or more rotor RPM related commands.

In some embodiments, the generating the one or more rotor RPM related commands further includes generating the one or more rotor RPM related commands further according a rate of change of the main rotor RPM. In some embodiments, the generating the one or more rotor RPM related commands further includes generating the one or more rotor RPM related commands in response to the measured main rotor RPM being below a main rotor RPM threshold. In some embodiments, the one or more rotor RPM related commands include at least one of a first command to change a pitch attitude of the rotorcraft or a second command to change a collective blade pitch angle of main rotor blades of the main rotor. In some embodiments, the first command to includes a command to pitch a front of the rotorcraft upwards, and the second command includes a command to decrease the collective blade pitch angle of main rotor blades. In some embodiments, generating the one or more rotor RPM related commands further includes at least one of generating the first command to change the pitch attitude of the rotorcraft in proportion to a rate of change of the main rotor RPM or generating the second command to change the collective blade pitch angle in proportion to the rate of change of the main rotor RPM. In some embodiments, the automated autorotation entry assist process further includes generating one or more forward speed related commands in response to a forward speed of the rotorcraft being above a target forward speed associated with a glide speed of the rotorcraft and according to at least a forward speed of the rotorcraft and the target forward speed, where the one or more forward speed related commands comprise one or more commands to adjust a pitch attitude of the rotorcraft, and sending a second signal to the flight control according to the one or more forwards speed related commands, and controlling the flight control according to the one or more forward speed related commands.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:
   one or more flight controls operational to control flight characteristics of a main rotor of a rotorcraft;
   a main rotor revolutions per minute (RPM) sensor operable to determine a measured main rotor RPM at which the main rotor is turning; and
   a monitoring system operable to:
      detect an engine failure of an engine of the rotorcraft;
      determine a main rotor RPM delta of the main rotor of the rotorcraft, wherein the main rotor RPM delta is a difference between the measured main rotor RPM and a target main rotor RPM;
      determine a target flight control setting according to the main rotor RPM delta, wherein the target flight control setting is set to a first flight control setting value in response to the main rotor RPM delta being a first delta value, and wherein the target flight control setting is set to a second flight control setting value different from the first flight control setting value in response to the main rotor RPM delta being a second delta value different from the first delta value;
      generate at least one rotor RPM related command according to the target flight control setting; and
      perform an automated autorotation entry assist process by controlling the one or more flight controls according to the at least one rotor RPM related command.

2. The rotorcraft according to claim 1, wherein the at least one rotor RPM related command comprises a first command to change a pitch attitude of the rotorcraft and a second command to change a collective blade pitch angle of main rotor blades of the main rotor.

3. The rotorcraft according to claim 1, wherein the monitoring system is operable to perform the automated autorotation entry assist process in response to the measured main rotor RPM being below a main rotor RPM threshold.

4. The rotorcraft according to claim 1, wherein the monitoring system is further operable to perform the automated autorotation entry assist process in response to a pilot being out of manual control of a pilot control of the rotorcraft.

5. The rotorcraft according to claim 1, wherein the at least one rotor RPM related command comprises at least one of a first command to change a pitch attitude of the rotorcraft or a second command to change a collective blade pitch angle of main rotor blades of the main rotor; and
   wherein the monitoring system being operable to determine the target flight control setting comprises the monitoring system being operable to determine the target flight control setting according to the main rotor RPM delta and a forward speed of the rotorcraft.

6. The rotorcraft according to claim 5, wherein the first command comprises a command to pitch the front of the rotorcraft upwards.

7. The rotorcraft according to claim 1, wherein the target flight control setting comprises at least a cyclic pitch setting for the main rotor, wherein the at least one rotor RPM related command comprises at least a first command to change a pitch attitude of the rotorcraft; and
   wherein the monitoring system being operable to determine the target flight control setting comprises the monitoring system being operable to determine the target flight control setting according to the main rotor RPM delta and further according to a current main rotor blade pitch setting and a current forward speed of the rotorcraft.

8. The rotorcraft according to claim 1, wherein the monitoring system is further operable to generate one or more forward speed related commands in response to a forward speed of the rotorcraft being above a target forward speed associated with a glide speed of the rotorcraft and according to at least a forward speed of the rotorcraft and the target forward speed; and wherein the monitoring system being operable to perform the automated autorotation entry assist process by controlling the one or more flight controls comprises the monitoring system being operable to perform the automated autorotation entry assist process by controlling the one or more flight controls according to the one or more forward speed related commands and further according to the at least one rotor RPM related command.

9. A flight control computer, comprising:
a processor; and
a non-transitory computer-readable storage medium storing a program to be executed by the processor, the program including instructions for:
performing, in response to a failure of at least one engine of a rotorcraft:
determining a target main rotor revolutions per minute (RPM);
determining a main rotor RPM delta of a main rotor of the rotorcraft, wherein the main rotor RPM delta is a difference between a measured main rotor RPM and the target main rotor RPM;
determining a target flight control setting according to the main rotor RPM delta, wherein the target flight control setting is set to a first flight control setting value in response to the main rotor RPM delta being a first delta value, and wherein the target flight control setting is set to a second flight control setting value different from the first flight control setting value in response to the main rotor RPM delta being a second delta value different from the first delta value;
generating at least one rotor RPM related command according to the target flight control setting; and
sending the at least one rotor RPM related command to a device controlling a flight control.

10. The flight control computer according to claim 9, wherein the at least one rotor RPM related command comprises a first command to change a pitch attitude of the rotorcraft and a second command to change a collective blade pitch angle of main rotor blades of the main rotor.

11. flight control computer according to claim 9, wherein the target flight control setting comprises at least a cyclic pitch setting for the main rotor, wherein the at least one RPM related command comprises at least a first command to change a pitch attitude of the rotorcraft; and
wherein the instructions for determining the target flight control setting includes instructions for determining the target flight control setting according to the main rotor RPM delta and further according to a current main rotor blade pitch setting and a current forward speed of the rotorcraft.

12. The flight control computer according to claim 9, wherein the at least one rotor RPM related command comprises at least one of a first command to change a pitch attitude of the rotorcraft or a second command to change a collective blade pitch angle of main rotor blades of the main rotor; and wherein the instructions for determining the target flight control setting include instructions for determining the target flight control setting according to the main rotor RPM delta and a forward speed of the rotorcraft.

13. The flight control computer according to claim 9, wherein the program further includes instructions for performing, in response to the failure of the at least one engine of the rotorcraft:
generating a forward speed related command in response to a forward speed of the rotorcraft being above a target forward speed associated with a glide speed of the rotorcraft and according to at least a forward speed of the rotorcraft and the target forward speed, wherein the forward speed related command comprises one or more commands to adjust a pitch attitude of the rotorcraft; and
controlling the flight characteristic of the main rotor by controlling the flight control of the rotorcraft connected to the main rotor according to the forward speed related command.

14. A method, comprising:
performing, in response to a failure of at least one engine of a rotorcraft, an autorotation process, comprising:
determining a target main rotor revolutions per minute (RPM);
determining a main rotor RPM delta of a main rotor of the rotorcraft, wherein the main rotor RPM delta is a difference between a measured main rotor RPM and the target main rotor RPM;
determining a target flight control setting according to the main rotor RPM delta, wherein the target flight control setting is set to a first flight control setting value in response to the main rotor RPM delta being a first delta value, and wherein the target flight control setting is set to a second flight control setting value different from the first flight control setting value in response to the main rotor RPM delta being a second delta value different from the first delta value;
generating at least one rotor RPM related command according to the target flight control setting; and
controlling one or more flight controls of the rotorcraft according to the at least one rotor RPM related command.

15. The method according to claim 14, wherein the performing the autorotation process comprises performing, in response to the failure of the at least one engine of the rotorcraft, further in response to a measured main rotor RPM of the main rotor being below a main rotor RPM threshold, and further in response to a pilot being out of manual control of a pilot control of the rotorcraft.

16. The method according to claim 14, wherein the at least one rotor RPM related command comprises a first command to change a pitch attitude of the rotorcraft and a second command to change a collective blade pitch angle of main rotor blades of the main rotor.

17. The method according to claim 14, wherein the at least one rotor RPM related command comprises at least one of a first command to change a pitch attitude of the rotorcraft or a second command to change a collective blade pitch angle of main rotor blades of the main rotor; and wherein the determining the target flight control setting comprises determining the target flight control setting according to the main rotor RPM delta and a forward speed of the rotorcraft.

18. The method according to claim 17, wherein the first command comprises a command to pitch the front of the rotorcraft upwards.

19. The method according to claim 14, wherein the target flight control setting comprises at least a cyclic pitch setting for the main rotor, wherein the at least one rotor RPM related command comprises at least a first command to change a pitch attitude of the rotorcraft; and wherein the determining the target flight control setting comprises determining the target flight control setting according to the main rotor RPM delta and further according to a current main rotor blade pitch setting and a current forward speed of the rotorcraft.

20. The method according to claim 14, further comprising generating one or more forward speed related commands in response to a forward speed of the rotorcraft being above a target forward speed associated with a glide speed of the rotorcraft and according to at least a forward speed of the rotorcraft and the target forward speed; and wherein the controlling the one or more flight controls according to the at least one rotor RPM related command comprises controlling the one or more flight controls according to the at least one rotor RPM related command and further according to the one or more forward speed related commands.

\* \* \* \* \*